United States Patent
Welch et al.

(10) Patent No.: US 7,716,099 B1
(45) Date of Patent: May 11, 2010

(54) SYSTEM AND METHOD FOR VOICE OVER IP (VOIP) SUPPORT FOR COMPUTER-IMPLEMENTED PROCESSES

(75) Inventors: Pamela R. Welch, Carrollton, TX (US); William W. Huckabee, Sachse, TX (US); Kenneth R. Howard, Allen, TX (US); Hiep Nguyen, Carrollton, TX (US); Sara D. Mattice, Farmersville, TX (US); Jennifer L. Reeves, Frisco, TX (US); James G. Johnson, Fort Worth, TX (US); Albert S. Baines, Little Elm, TX (US); Stephen H. Wright, Dallas, TX (US)

(73) Assignee: Intuit Inc., Mountain View, CA (US)

( * ) Notice: Subject to any disclaimer, the term of this patent is extended or adjusted under 35 U.S.C. 154(b) by 577 days.

(21) Appl. No.: 11/481,491

(22) Filed: Jul. 6, 2006

(51) Int. Cl.
*G06Q 99/00* (2006.01)

(52) U.S. Cl. .................. 705/35; 715/705; 379/88.19; 379/88.17

(58) Field of Classification Search ............ 379/265.01, 379/88.19, 88.17; 715/705; 709/217; 714/46; 370/356
See application file for complete search history.

(56) References Cited

U.S. PATENT DOCUMENTS 6,615,240 B1 9/2003 Sullivan et al.
2004/0083267 A1 4/2004 Thompson
2005/0243979 A1* 11/2005 Starbuck et al. .......... 379/88.19
2006/0015558 A1 1/2006 Bodin et al.
2006/0265656 A1* 11/2006 Lambert et al. ............ 715/705
2007/0168457 A1* 7/2007 Huerta et al. .............. 709/217
2007/0263838 A1 11/2007 Wiseman et al.
2007/0291923 A1* 12/2007 Hsieh .................... 379/265.01

OTHER PUBLICATIONS

Danny Bradbury; Lifelines on the Industry Trend or Event, Sep. 29, 2000; Computer Weekly, p. 52.*

* cited by examiner

*Primary Examiner*—Behrang Badii
(74) *Attorney, Agent, or Firm*—Osha • Liang LLP

(57) ABSTRACT

System and method for providing customer support via Voice Over Internet Protocol (VoIP) for particular aspects of tax programs and other computer-implemented processes. Different areas of tax preparation may be identified as different modules in the tax program. After selecting a module, a user of the tax program may select a particular document or particular field on a document that the user may need assistance with. A user interface may provide one or more mechanisms whereby the user may access VoIP support targeted at the particular aspect (e.g., module, document, or field). By enabling users to select particular aspects of the tax program and to invoke VoIP support for aspects at which support is needed, embodiments may enable users to sort themselves into queues targeted at the particular aspects for which support is needed before contacting the vendor's support system.

27 Claims, 12 Drawing Sheets

| Menu 1  Menu 2  Menu 3  Menu 4 | Menu bar 252 |
|---|---|
| □ △ ⬠ ◯ ☆ | Tool bar 254 |
| /Tab 1 \/ Forms \/ Tab 3 \/ Tab 4 \ | Tab bar 256 |

MODULES

Module 1
Module 2
...

FORMS

Form 1
Form 2
Form 3
Form 4
...

Current tax document 220A (Form 1)

Description............................................................... Field 222E Description............................................................... Field 222F    Field 222G 12345.67

Description............................................................... Field 222H Description.............................................

Description............................................................... Field 222J Description............................................................... Field 222K Description............................................. Field 222L Display 250

*Figure 5A*

| Menu 1 Menu 2 Menu 3 Menu 4 | Menu bar 252 |
| □ △ ○ ○ ☆ | Tool bar 254 |
| Tab 1 \ Forms \ Tab 3 \ Tab 4 \ | Tab bar 256 |

MODULES

Module 1
Module 2
...

Current tax document 220A

FORMS

Form 1
Form 2
Form 3
Form 4
...

Description............................................................... Field 222E Description............................................................... Field 222F    Field 222G 12345.67

Description...............................................................

Description........................................................... Field 222H Description........................................................... Field 222J Description........................................................... Field 222K Description........................................................... Field 222L Display 250

*Figure 5B*

SYSTEM AND METHOD FOR VOICE OVER IP (VOIP) SUPPORT FOR COMPUTER-IMPLEMENTED PROCESSES

BACKGROUND

Tax preparation software programs (hereinafter referred to as "tax programs") are available from various vendors that assist users in preparing accurate Federal and/or State income tax returns and other tax forms. These tax programs may guide the user through income, property, sales, or other type of tax return processes for a governmental entity or agency (e.g., Federal, State, county, city, district, or other municipality) step-by-step, and may automatically perform necessary tax preparations in accordance with user-entered data input, forms, schedules, and tax data, tables, and formulas stored with or coded into the program. Personal and/or business tax programs may be provided. In addition, both personal and professional versions of these programs may be offered. Professional versions may be used by tax preparation professionals to prepare various tax returns for multiple customers. Further, these tax programs may be used to prepare annual taxes, quarterly taxes, etc.

Tax programs typically include electronic tax documents—the various forms, schedules, worksheets, etc. needed to prepare and file tax returns, which may be stored and accessed as electronic documents. For example, Federal tax return forms that may be provided may include, but are not limited to, 1040, 1040A, 1040EZ, 1040NR, and 1040X forms. In addition, various tax forms and schedules for various States may be included. These electronic tax return documents may be graphically presented by the tax program to the tax preparer on a display device (e.g., a computer monitor). Typically, a tax program will provide a user interface with various user interface mechanisms (menus, dialog boxes, etc.) and user-selectable interface items (menu items, buttons, controls, text entry boxes, etc.) whereby the preparer may access the documents as needed and enter and/or modify data on the various tax documents using one or more data entry/cursor control mechanisms, such as a keyboard and mouse. Typically, these electronic documents are presented on the user interface as templates that, when partially or completely filled out, may be "saved" for the particular taxable entity for which the documents are prepared. Typically, the preparer will enter necessary data and information to the documents via the user interface, and, when done, access the user interface to direct the tax program to complete the preparation of the tax documents.

Instead of or as an alternative to entering the necessary data and information directly to the electronic tax return documents (e.g., directly to a 1040 form), some implementations of tax programs may provide an input mechanism whereby the user inputs the necessary data and information into input fields on data entry displays presented to the user by the tax program. Data and information entered by the user via the input fields may then be automatically transferred into the appropriate locations on the tax return documents. The tax program may perform any necessary calculations using the entered data and information, and possibly data and information from other sources such as previous tax returns, to generate appropriate calculated values for certain fields of the tax return documents.

In some cases, historical tax return information or data for the user (e.g., tax return information or data from a previous year) may be used in preparation of a current tax return. In addition, some tax return information or data may be transferred from one current form to another current form. For example, information or data from a current Federal 1040 form may be transferred to a current State tax return form. Note that some fields on the tax return documents may include values that are calculated by the tax program from entered and/or transferred data in accordance with various formulas for calculating the fields applied by the tax program. Thus, the preparer may not be aware of how certain values on a tax document were calculated, or where the values or the data they were calculated from came from.

Conventionally, tax program vendors have employed telephone support systems for their tax programs. Typically, a telephone support system provides a "1-800" or other such toll-free number through which customers may communicate directly by voice with a support representative. Telephone support systems typically have either a human operator that receives and screens calls from customers with the intent of directing the customers to the correct support representative(s), or an automated "help menu" interface whereby a customer selects from a menu of various options to hopefully connect to the correct support representative to address the customer's questions. Conventional telephone support systems tend to be time consuming for the customer; the customers often have to wait "on hold" for an operator or support representative to answer. In addition, such systems are often difficult for the customers to navigate through to the correct support representative to answer their questions, often resulting in customers ending up talking to the wrong support representative, or having to be redirected elsewhere. Further it may be difficult to track problem areas and to identify high traffic problem areas in the tax program with a telephone support system, as these systems typically have to rely on the support representatives' logging of the customers' calls, which may or may not be performed correctly, and which may involve considerable delay between the logging of the calls and the analysis of the logs.

VoIP

VoIP (Voice over Internet Protocol) refers to a set of facilities that manage the delivery of voice or other audio content over the Internet. Through VoIP, voice information in digital form may be sent over the Internet in discrete packets as an alternative to the traditional circuit-committed protocols of the public switched telephone network (PSTN). An advantage of VoIP and Internet telephony is that VoIP avoids the tolls charged by conventional telephone services.

SUMMARY

Various embodiments of a system and method for providing customer support via Voice Over Internet Protocol (VoIP) for particular aspects of tax preparation software programs (hereinafter referred to as tax programs) and other computer-implemented processes are described. Tax programs may guide the user through income, property, sales, or other types of tax return processes for a governmental entity step-by step, and may automatically perform necessary tax preparations in accordance with user-entered data input, forms, schedules, and tax data, tables, and formulas stored with or coded into the program. Note that tax returns may be part of a broader class of financial returns. Financial returns may be defined as sets of one or more documents that may be prepared according to the requirements or at the request of some governmental entity for a specified reporting period. Therefore, "tax program" is used herein as an example of the broader class of financial return preparation programs, and "tax return" is used herein as an example of the broader class of financial returns.

In embodiments of a VoIP support system for tax programs, different areas of tax preparation may be identified as different modules in the tax program. In an instance of a tax program implementing an embodiment of a VoIP support mechanism as described herein, a user of the tax program may "drill down" to a particular aspect of the tax program that the user may need assistance with; e.g., to a particular module, a particular electronic tax document of the module, or a particular field on an electronic tax document. The tax program's user interface may provide one or more mechanisms whereby the user may then access VoIP support targeted at the particular aspect of the tax program; e.g., the particular module, the tax document, or field of an electronic tax document that the user has selected.

In one embodiment, on a support system for the tax program, incoming support requests via VoIP may be placed into particular ones of a plurality of support queues each associated with or assigned to a particular support representative. The support representatives may then process queued customer VoIP support requests from the associated or assigned support queues. Note that each support queue may be associated with one or more user-selectable interface items in particular places of the tax program related to particular aspects of the tax program. For example, in one embodiment, each module, electronic tax document and one or more particular fields on each tax document in a module for which VoIP support is provided via the user interface of the tax program may have an associated support queue.

By enabling users to "drill down" to a particular aspect of the tax preparation process implemented through a tax program (e.g., a module, electronic tax document, or field of a tax document) and to invoke VoIP support at the particular aspect of the tax preparation process at which support is needed, embodiments of the VoIP support system may enable the users of the tax program to sort themselves into the particular support queues targeted at the particular aspects (modules, tax documents, fields, or other elements) of the tax program or tax preparation process for which the users need support before actually contacting the vendor's support system via VoIP. When a user invokes VoIP support for a particular aspect of the tax program, the user's VoIP support request may be automatically placed into the support queue associated with that particular aspect of the tax program or tax preparation process for processing by the support representative associated with that support queue.

In one embodiment, once a user contacts a support representative via VoIP, the electronic tax return document(s) in question, possibly minus encrypted or otherwise hidden personal information, may be electronically transferred to the support system and made viewable to the support representative via the network link, which may aid the support representative in identifying and addressing the user's particular problem or question.

Embodiments of the VoIP support system may allow the tax program vendor to identify high-traffic problem areas of the tax program and to thus allocate additional support resources (e.g., additional support representatives) to cover these areas. The VoIP support system may automatically log activities on the support queues, and may used this logged information, for example, to automatically identify busy support queues for which additional support may be needed and thus allow the vendor to dynamically allocate resources to busy support queues. In addition, the vendor may generate automated information that addresses a particular recurrent problem or question that has been detected through the monitoring of activities on the support queues. In one embodiment, once a user's VoIP support request is in a support queue, the support system may offer or provide audio recordings, video help, or other automated assistance or information targeted at particular known problem area(s) or issue(s) of the particular aspect of the tax program or tax preparation process corresponding to the particular support queue. Thus, in one embodiment, the vendor's VoIP support system may provide automated assistance targeted at particular known problems associated with aspects of the tax program or tax preparation process. General information, tutorial information, etc. may also be automatically provided to users via the VoIP support system in response to VoIP support requests.

While embodiments of the VoIP support system are generally described herein in reference to tax preparation software programs, embodiments of the VoIP support system may be implemented for other types of computer-implemented processes, programs, and applications, including but not limited to other types of financial software programs.

BRIEF DESCRIPTION OF THE DRAWINGS

FIG. 5A illustrates an exemplary, generic display and user interface that may be provided by a tax program according to one embodiment.

FIGS. 5B through 5E illustrate exemplary user interface mechanisms and elements that may be provided for accessing VoIP support from a tax program according to various embodiments.

Figure 1:
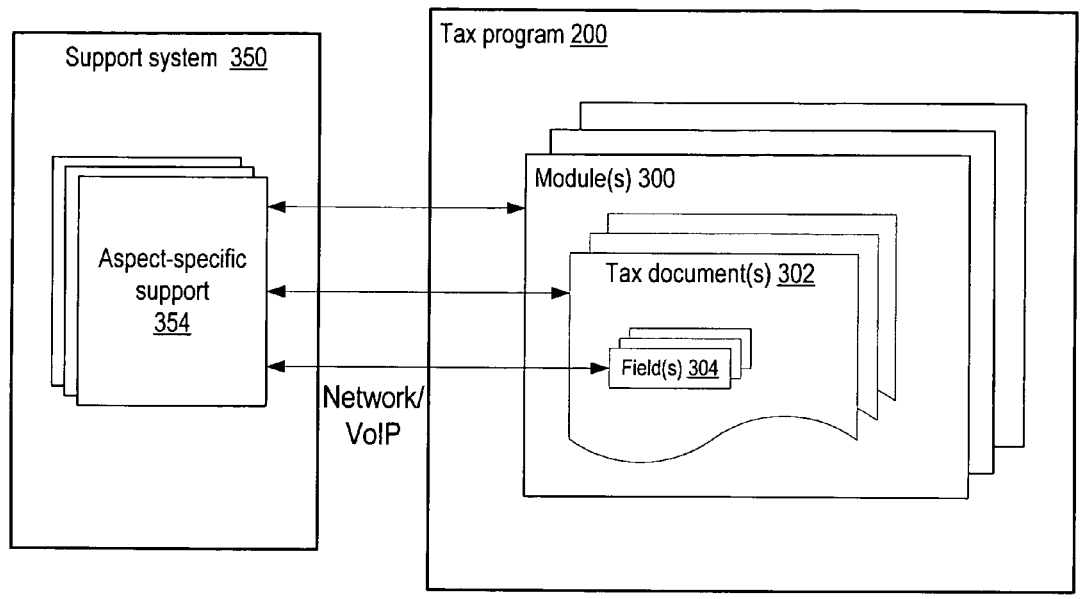
FIG. 1 illustrates a high-level view of providing support specific to particular aspects of a tax program according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a system and method for providing customer support via Voice Over Internet Protocol (VoIP) for tax preparation software programs (hereinafter referred to as tax programs) and other computer-implemented processes are described. Tax programs may guide the user through income, property, sales, or other type of tax return processes for a governmental entity (e.g., Federal, State, county, city, district, or other municipality) step-by-step, and may automatically perform necessary tax preparations in accordance with user-entered data input, forms, schedules, and tax data, tables, and formulas stored with or coded into the program. Note that tax returns may be part of a broader class of financial returns. Financial returns may be defined as sets of one or more documents that may be prepared according to the requirements or at the request of some governmental entity for a specified reporting period. Note that financial returns may be tax or tax-related returns, or informational returns that are required for reporting purposes but that do not result in or require the payment of any actual taxes. Examples of informational returns may include, but are not limited to, partnership returns and benefit plan returns. Thus, tax programs may be classified as a type of, or function or module of, financial return preparation programs. Therefore, it is important to note that "tax program" is used herein as an example of the broader class of financial return preparation programs, and "tax return" is used herein as an example of the broader class of financial returns. Thus, the system and method as described herein may be more generally applied for providing customer support via Voice Over Internet Protocol (VoIP) for financial return preparation programs in general, with tax programs and tax return preparation provided as an example of a specific application of the system and method. Furthermore, while embodiments of the VoIP support system are generally described herein in reference to tax programs and the tax preparation process as an example of a specific application of the system and method, it is important to note that embodiments of the VoIP support system may be implemented for other types of computer-implemented processes, programs, and applications, including but not limited to other types of financial software programs.

In embodiments of a VoIP support system for tax programs, different areas of tax preparation may be identified as different modules (e.g., 1040 federal returns, individual state returns, 1120 federal, corporate state returns, etc.) in the tax program. After selecting a module, a preparer or other user (e.g., a taxable entity for whom a tax return was prepared) may drill down to a particular tax document of the module, or even to a particular field of a tax document, that the user may need assistance with. The tax program's user interface may provide one or more mechanisms whereby the user may access VoIP support targeted at specific aspects of the tax program, such as a particular module, a particular tax document, or a particular field of a tax document. For example, particular fields on a tax document may be configured to allow the user to, via VoIP, connect to and communicate with particular support representatives specializing in support for the fields or for known problem areas.

Since multiple customers on different systems may invoke VoIP support for the same aspect of a tax program or tax preparation process (e.g., for the same module, document, or the same field on a particular document), and thus may target multiple VoIP support requests at a particular support representative at or near the same time, in one embodiment, incoming VoIP support requests from customers may be placed into support queues associated with particular support representatives on a support system. The support representatives may then process queued customer VoIP support requests from the corresponding support queues. Note that each VoIP support queue may be associated with one or more aspects of the tax program or tax preparation process each associated with one or more user-selectable interface items in the user interface presented to the users by the tax program. For example, one or more modules, one or more tax documents in each module, and one or more particular fields on each tax document in a module may each be associated with a particular VoIP support queue and its corresponding support representative(s). Note, however, that two or more aspects of the tax program (e.g., two or more fields on one or more documents) may be associated with one support queue and its corresponding support representative(s).

By enabling users to "drill down" to a particular aspect (e.g., module, tax document, or field of a tax document) and to invoke VoIP support for a particular aspect of the tax preparation process at which support is needed, embodiments of the VoIP support system may enable users of the tax program to sort themselves into the particular support queues targeted at the particular aspects (e.g., modules, tax documents, fields, or other elements of the tax program) or tax preparation process for which the users need support before actually contacting the vendor's support system via VoIP. When a user invokes VoIP support for a particular aspect of the tax program, the user's VoIP support request is automatically placed into the support queue associated with that particular aspect of the tax program or tax preparation process for processing by a support representative associated with that support queue.

In one embodiment, once a user's VoIP support request is in a support queue, the support system may offer or provide audio recordings, video help, or other automated assistance or information targeted at particular known problem area(s) or issue(s) of the aspect of the tax program or tax preparation process corresponding to the particular support queue. Thus, in one embodiment, the vendor's VoIP support system may provide automated assistance targeted at particular known problems associated with particular aspects of the tax program or tax preparation process. General information, tutorial information, etc. may also be automatically provided to users via the VoIP support system in response to VoIP support requests. The tax program vendor's VoIP support system may also assign support representatives that may specialize or be trained in one or more particular aspects of the tax program or tax preparation process to support queues corresponding to the support representative's area of specialization or training and that are available to address the users' questions via the support queues and over VoIP. Thus, the VoIP support system may enable users to quickly and easily contact the correct support representatives to address their particular questions regarding particular aspects of the tax preparation process or the tax program in general. In one embodiment, when a user invokes VoIP support for a particular aspect of the tax preparation process, one or more tax return documents related to the particular aspect, possibly minus encrypted or otherwise hidden personal information, may be made viewable to the support representative via the network link before or during the VoIP communications with the user, which may aid the support representative in identifying and addressing the problem over VoIP.

Note that electronic documents of a tax return may be referred to herein as "tax electronic documents" or simply as "electronic documents." Further note that electronic documents of a tax return as described herein are intended to include both tax return documents (e.g., 1040, 1040A, 1040EZ, 1040NR, and 1040X forms of a Federal tax return) and data entry displays that include input fields for entering data and information to be transferred into tax return documents. Further, note that electronic documents as used herein may also include other types of electronic documents used in the preparation of tax returns, including but not limited to other electronic documents that are or were used as sources for data and/or information in current or previous tax returns. An example would be an electronic W-2 Form, but other financial and non-financial electronic documents may also be used as source documents for preparing tax returns, and are also intended to be included.

FIG. 1 illustrates a high-level view of providing VoIP support specific to particular aspects of a tax program according to one embodiment. An instance of tax program 200 may be installed and executed on a computer system. The computer system may typically be, but is not limited to, a personal computer (PC) such as a desktop computer, laptop, or notebook computer. Alternatively, tax program 200 may be a network- or web-based tax return preparation program, in which users may prepare various tax forms via a connection to a remote computer system (e.g., a server), without necessarily installing a tax program on their local computer systems (such as a personal computer or laptop).

A preparer may execute tax program 200 to prepare a current tax return for a taxable entity. The taxable entity may be the preparer, or may be another taxable entity for which the preparer is preparing the tax return. Note that the taxable entity may be a person, a business, or other entity for which a tax return is to be prepared. Further note that tax program 200 may be a personal or professional version. Professional versions may be used by tax preparation professionals to prepare various tax returns for multiple customers. Further note that the current tax return being prepared may be associated with a particular module (e.g., 1040 federal returns, individual state returns, 1120 federal, corporate state returns, etc.) in the tax program. Thus, the tax program may provide a user interface that allows the preparer to select an appropriate module.

Upon initiation of preparation of a current tax return for a taxable entity, the tax program 200 may provide a mechanism or mechanisms via which the preparer may transfer at least a portion of previous tax return information or data, or tax-related information or data from one or more other sources, for use in relevant places of the current tax return that is being prepared. Note that information or data that may be transferred may include textual information, such as the taxable entity's name, address, and other similar information, data values that were entered into, transferred into, or calculated using a previous tax program, or information and data values obtained from other sources, such as electronic W-2 forms.

Tax program 200 may provide a user interface to guide or step the preparer through one or more electronic tax documents 302 (e.g. forms, worksheets, schedules, data entry displays, etc) to prepare the current tax return. Typically, a tax return involves the preparation of several such electronic documents, and thus the tax preparation process can be quite complex. In some implementations, these electronic documents may be presented to the preparer as templates on a display device, and the tax program 200 may provide a data entry mechanism via a user interface that allows the preparer to enter and/or modify data and information in various fields of the electronic tax documents 302. In addition, one or more of the values from previous tax return information and/or other sources may be transferred into or used in the calculation of values for fields 304 of electronic tax documents 302. Further, values from a field or fields 302 on one or more electronic tax documents 302 may be transferred to other electronic tax documents 302. For example, a calculated value from a worksheet may be transferred into a field 302 on another electronic tax document 302.

Instead of or as an alternative to entering the necessary data and information directly to the tax documents 302 (e.g., directly to a 1040 form), some implementations of tax programs may provide an input mechanism whereby the user inputs necessary data and information into input fields 304 on data entry displays presented to the user by the tax program as electronic tax documents 302. Note that data and/or information from other sources, which may include but is not limited to data and/or information from a previous tax return, may be transferred into or used in the calculation of values for some fields 304 in the data entry displays. Data and information from the data entry displays may then be automatically transferred into the appropriate locations on the electronic tax return documents (e.g., onto an electronic 1040 form). The tax program may perform any necessary calculations using the data and information from the data entry displays, and possibly data and information from other sources such as previous tax returns, to generate appropriate calculated values for certain fields of the tax return documents.

In addition to preparer-entered or transferred values, tax program 200 may perform various calculations to generate values for some fields 304 in electronic tax documents 302. Note that inputs to a particular calculation to generate a value for a field 304 may include one or more values from one or more sources. One or more data values entered by the preparer via the data entry user interface may be used in calculations to generate new values from some fields 304 in electronic tax documents 302. In some cases, one or more values from previous tax return information may be used in Calculations to generate new values for some fields. For example, a calculation may be performed that uses just one value from previous tax return information or one entered value as input. As another example, a calculation may be performed that uses two or more values from previous tax return information or two or more entered values. As another example, a calculation may be performed that uses one or more values from previous tax return information and one or more values entered by the preparer through the data entry user interface. In addition, calculated values or values from fields 304 on electronic tax documents 302 may be used as input into other calculations. Also note that some values used in calculations may be coded as "constants" into the tax program, or alternatively may be read into the tax program from a stored data file as needed.

Before, during or after preparation of a tax return, a preparer (or taxable entity, if not the same person) may have questions or problems related to particular aspects of tax program 200 for which the preparer may need or desire to contact the vendor for support. For example, a preparer may have questions as to where certain data or information displayed in an electronic tax documents 302 came from or as to how a value in a field 304 was calculated, or may have questions concerning how to prepare a particular electronic tax document 302, or even questions at the module 300 level.

Conventionally, the preparer or other use would have to telephone a support system provided by the vendor of the tax program for assistance. In embodiments of a VoIP support system, before, during, and after the preparation of a tax return as described above, the tax program may provide one or more user interface mechanisms or elements that allow the preparer to invoke VoIP support through support system 350 that is specific to an aspect (e.g., a module, document 220, or field 222) of the tax program 200. As an example, right-clicking on a field 304 of an electronic tax document 302 may cause a menu or dialog box to be displayed, from which the preparer or other user may select to invoke VoIP support for the field 304. Selecting VoIP support for the field 304 may invoke a VoIP connection over a network to a remote support system 350 (e.g., a support system provided by the vendor of the tax program), where, in one embodiment, the preparer's VoIP support request may be placed in a support queue corresponding to a particular aspect of the tax program 200 that is associated with the selected field 304. A support representative with skills specific to the particular aspect of the tax program (e.g., a particular field 304) corresponding to the support queue may be assigned to the support queue. The support representative may process VoIP support requests from the associated support queue, and so may process the user's VoIP support request to address the user's particular problem or question via VoIP. In some embodiments, the preparer may be directly linked to a support representative via VoIP without being placed in a support queue.

Instead of or in addition to a VoIP connection to a particular support representative, some embodiments may provide audio, video, textual, or other type of automated support information via a VoIP connection or via some other communications channel in response to users' VoIP support requests. For example, if a particular field 304 has been detected by the support system 350 as having a number of preparers with a similar question or questions about the field, the vendor may add a response to the question(s) to a "FAQ" list, for the field 304, or may prepare other textual, graphical, audio, or video information that addresses the question(s) and that is made available to the preparer when the preparer invokes VoIP support for the field 304. If the preparer does not receive the needed information from the automated information, or has additional questions or concerns, the preparer may choose to communicate directly with a support representative via VoIP.

Figure 2:
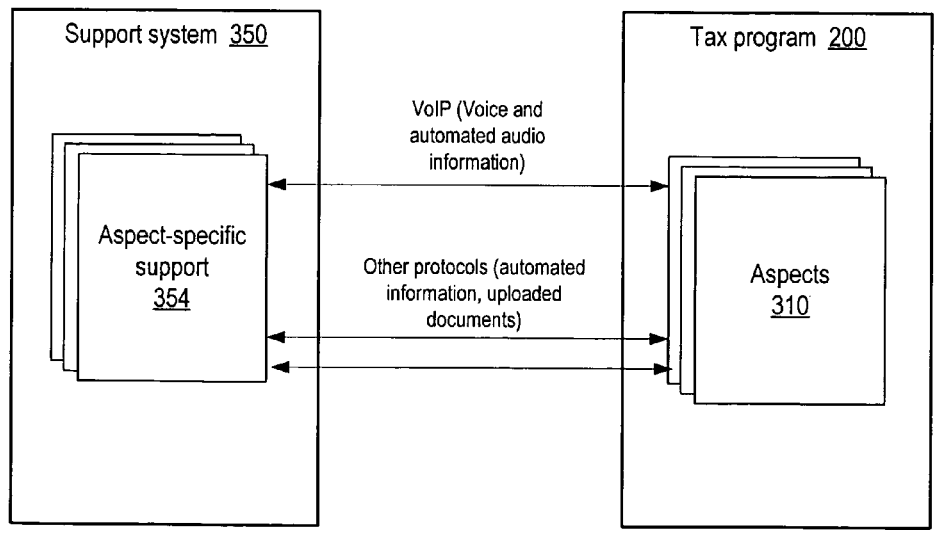
FIG. 2 illustrates communications channels between a support system and a tax program according to one embodiment.

Note that a VoIP connection with a support representative and automated support information may be provided via computer systems over a network in accordance with one or more of various packetized network protocols and not via conventional telephone connections, although computer connections to support system 350 may at least in part be accomplished via the conventional telephone network using modems. FIG. 2 illustrates communications channels between a support system and a tax program according to one embodiment. In one embodiment, voice communications with support representatives and possibly automated audio information (e.g., recorded voice information) may be provided to the tax program via VoIP. In one embodiment, one or more other packetized network protocols may be used to provide automated information, including, but not limited to, textual, audio, video, and graphical support information related to specific aspects 310 of the tax program 200. In addition, one or more documents related to specific aspects 310 may be uploaded to support system 350 from tax program 200 via one or more other packetized network protocols.

Figure 3:
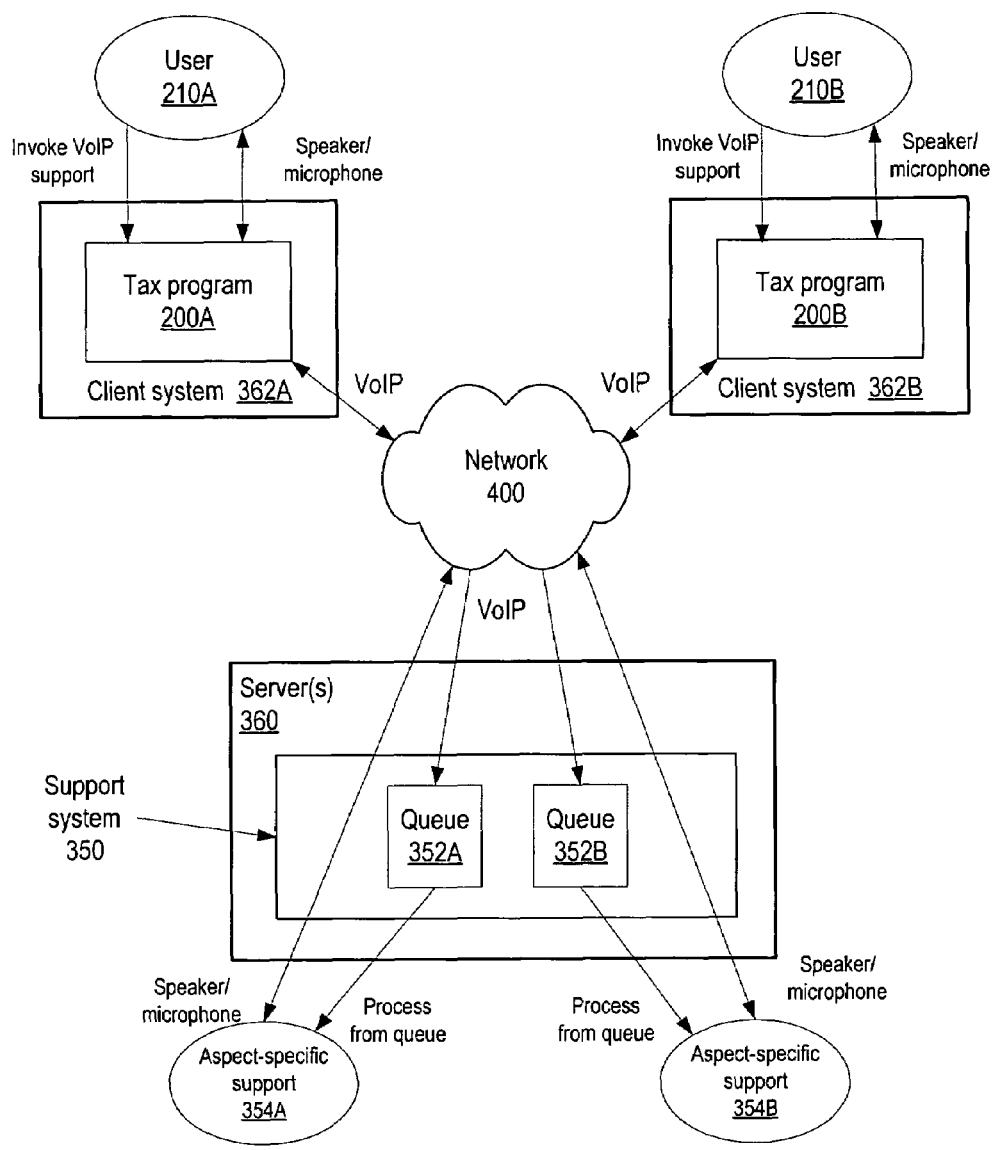
FIG. 3 illustrates a network architecture of an exemplary VoIP support system according to one embodiment.

FIG. 3 illustrates a network architecture of an exemplary VoIP support system according to one embodiment. Tax program 200 instances on multiple client systems 362 may be configured to connect via VoIP over network 400 to support system 350 on server(s) 360. Note that a client system 362 may be equipped with a speaker and microphone (e.g., a headset) whereby the user 210 may communicate with a support representative 354 via VoIP. To connect to support system 350, a user 210 may invoke VoIP support at for a particular aspect of tax program 200 via a user interface mechanism. Tax program 200 may provide one or more user interface mechanisms whereby a user 210 may, for example, invoke VoIP support for a particular aspect (e.g., for a particular module, electronic tax document, or field of a tax document). An exemplary user interface for tax program 200 is described below in FIGS. 5A through 5E and FIG. 6.

Invoking VoIP support for a particular aspect of tax program 200 may generate a VoIP support request that is transmitted to support system 350 via network 400. In one embodiment each VoIP support request from client systems 362 may be "tagged" by tax program 200 with information that identifies the aspect of the tax program or tax preparation process for which the VoIP support request was invoked and that enables support system 350 to place the incoming VoIP support request into the particular support queue 352 associated with the particular aspect of the tax program 200 or tax preparation process for which the VoIP support request was invoked. Note that, in one embodiment, VoIP support requests invoked for two or more different aspects in tax program 200 may be placed into one support queue 352. For example, two different electronic tax documents may include the same or a similar field, and therefore VoIP support requests invoked for these fields may be placed into the same support queue 352.

Aspect-specific support 354 may include, but is not limited to, support representatives that are skilled in particular aspects of tax program 200 and/or of tax preparation in general. These support representatives may each be assigned to one or more particular support queues 352 each associated with an aspect of tax program 200 and/or for tax preparation in general in which the support representative is skilled. A support representative assigned to a particular support queue 352 may process VoIP support requests from the queue 352, for example in first-in, first-out (FIFO) order. Note that one or more support representatives may be assigned to, and thus process VoIP support requests from, a particular support queue 352. Further note that a support representative may be assigned to and process VoIP support requests from two or more support queues 352.

When processing a particular VoIP support request from a support queue 352, a support representative may connect to and communicate with the user 210 that invoked the request via VoIP over network 400. Thus, each support representative may have access to a speaker/microphone connection to VoIP via support system 350. While not shown on FIG. 3, in one embodiment, each support representative may be working at a work station that may be locally or remotely connected to server(s) 360 via a network, e.g. a Local Area Network (LAN), and that is configured to support VoIP connections and communications between support representatives and users 210.

In one embodiment, once a user 210 is in communication with a support representative via VoIP, an electronic tax document in question may be electronically transferred and made viewable to the support representative via network 400 (e.g., by being "uploaded" to the support system 350 from a client system 362), which may aid the support representative in identifying and addressing the user's problem. Note that, in one embodiment, personal information on the tax document may be encrypted or otherwise hidden when transmitted to and viewed by the support representative.

Instead of or in addition to a VoIP connection to a particular support representative, some embodiments may provide audio, video, textual, or other types of automated support for particular aspects in response to a VoIP support request via a VoIP connection or other communications channel. For example, if a particular field of an electronic tax document has been detected by the support system 350 as having a number of users 210 with a similar question or questions about the field, the vendor may add a response to the question(s) to a "FAQ" list, for the field, or may prepare audio, textual, or video information that addresses the question(s) and that is made available to a user 210 when the user invokes VoIP support for the field. In one embodiment, relevant automated information may be made available as automated support to users 210 when waiting for a support representative to respond on a support queue 352. In some cases, a user 210 may find the information they need in the provided automated support. If the user 210 does not receive the information they need from the automated support, the user 210 may wait on queue to communicate directly with a support representative via VoIP. In one embodiment, support system 350 may provide user-selectable options to users 210 on queues 352 to either access automated support or to connect to a support representative 354 via VoIP. Note that all of the above is provided via computer systems over network 400 in accordance with one or more of various packetized network protocols and not via conventional telephone connections, although computer connections to sever(s) 360 may at least in part be accomplished via the conventional telephone network using modems.

Figure 4:
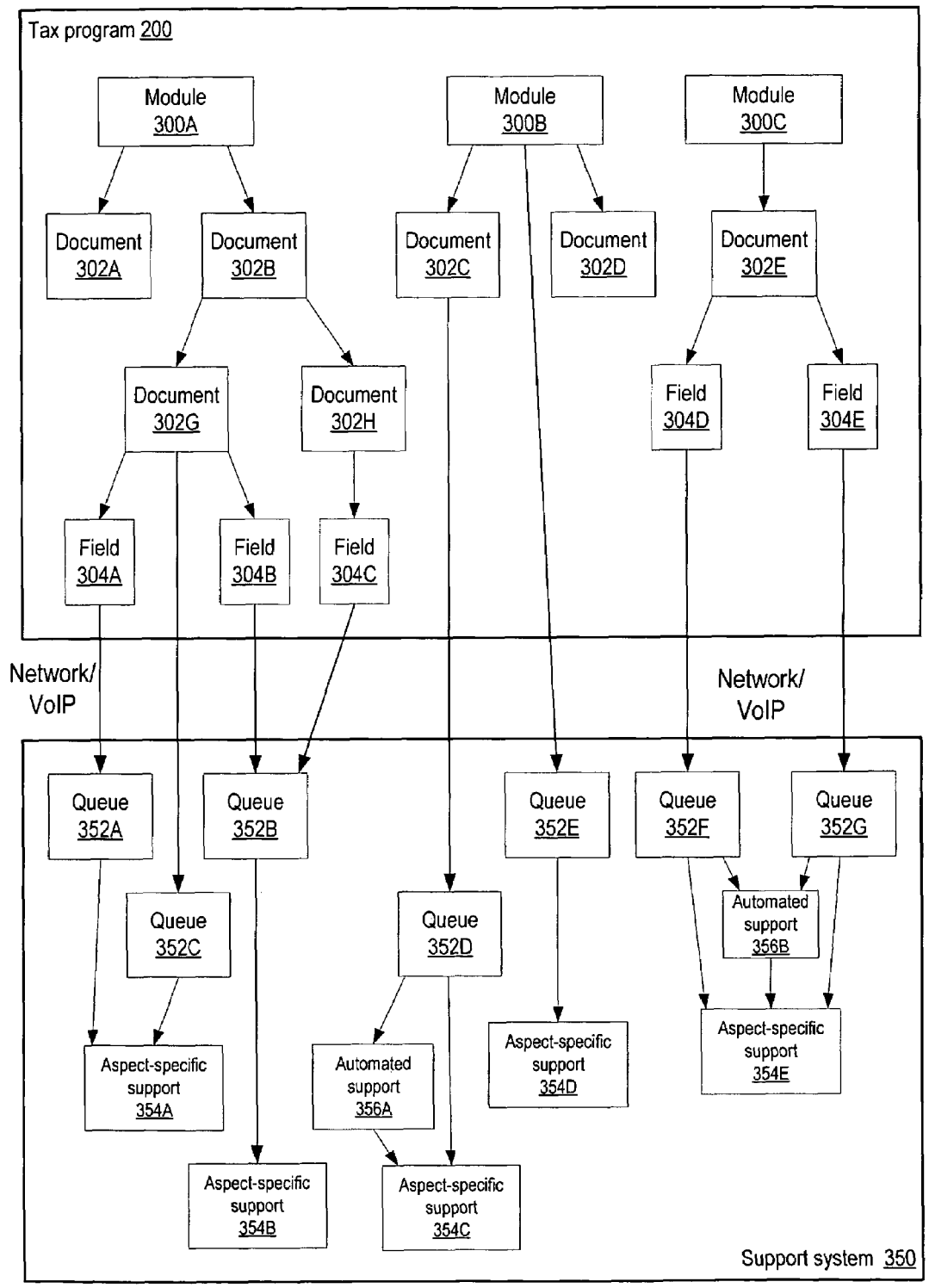
FIG. 4 illustrates a hierarchy of modules, associated documents, and fields of the documents of a tax program, and the relationships between the modules, documents and fields and the queues and associated support representatives of a VoIP support system, according to one embodiment.

FIG. 4 illustrates a hierarchy of aspects (e.g., modules, associated documents, and fields of the documents) of a tax program, and the relationships between the aspects and the queues and associated aspect-specific support of a VoIP support system, according to one embodiment. A tax program 200 may support two or more modules 300 specific to a governmental entity (e.g., 1040 federal returns, individual state returns, 1120 federal, corporate state returns, county, city, district, or other municipal return, etc.). A user of tax program 200 may select from among modules 300; for example, a tax preparer may select a particular module 300 to prepare a tax return to a particular governmental entity for a specified period for a particular taxable entity. Under each module 300, one or more electronic tax documents 302 may be provided. Some modules 300 may have a hierarchy of documents 302, with one or more documents below a "higher" document in the hierarchy. For example, in module 300A, documents 302G and 302H are under document 302B in the hierarchy. Each document 300 may include one or more fields 304. The modules 300, electronic documents 302, and fields 304 may be made accessible to a user (e.g., a tax preparer) via a user interface provided by tax program 200. The user interface of the tax program 200 may also provide one or more user interface mechanisms via which the user may invoke VoIP support each targeted at a particular aspect of the tax program 200 (e.g., targeted at particular module 300, a particular document, 302, or a particular field 304 of a document 302 related to the particular aspect of the program).

Invoking VoIP support for a particular aspect of tax program 200 (e.g., at a particular module 300, a particular document, 302, or a particular field 304 of a document 302) may generate a VoIP support request that is transmitted to support system 350 via a network. A VoIP support request from client systems 362 may be "tagged" by tax program 200 with information that enables support system 350 to place the incoming VoIP support request into the particular support queue 352 associated with the particular aspect of tax program 200 for which the VoIP support request was invoked. In one embodiment, support queues 352 may be associated with modules 300, documents 304, or fields 306. However, it is important to note that support queues 352 may be associated with other elements of tax program 200 that are related to or classified as aspects of the tax program. For example, a tax document 302 may be subdivided into two or more sections. Each section may include one or more fields 304. The tax program 200 may provide a user interface item whereby a user may invoke VoIP support for a particular section of a document 302 as an "aspect" of the tax program, rather than or in addition to the entire document 302 or a particular field 304 of the document 302. VoIP requests invoked from this user interface item may then be placed in a queue 352 associated with the particular section of the document 302.

In one embodiment, VoIP support requests originating from two or more different places or elements in tax program 200 may be classified as being related to one particular aspect of the tax program and thus may be placed into one support queue 352 associated with that particular aspect. For example, two different tax documents may include the same or a similar field, and therefore VoIP support requests invoked from these fields may be placed into the same support queue 352. In FIG. 4, for example, VoIP requests generated for field 304B of document 302G and field 304C of document 302H are shown as being placed into queue 352B of support system 350.

Aspect-specific support 354 may include, but is not limited to, support representatives are skilled in particular aspects of tax program 200 and/or of tax preparation in general. These support representatives may each be assigned to one or more particular support queues 352 each associated with an aspect of tax program 200 and/or for tax preparation in general in which the support representative is skilled. A support representative assigned to a particular support queue 352 may process VoIP support requests from the queue 352, for example in first-in, first-out (FIFO) order. Note that one or more support representatives may be assigned to, and thus process VoIP support requests from, a particular support queue 352. Further note that a support representative may be assigned to and process VoIP support requests from two or more support queues 352.

Instead of or in addition to a VoIP connection to a particular support representative, some embodiments may provide audio, video, textual, or other type of automated support 356 via a VoIP connection or other communications channel. For example, the support system 350 may provide a. "FAQ" list, for a module 300, document 302, or field 304, or may provide other types of audio, textual, or video information that may address users' question(s) and that are made accessible to a user when the user invokes VoIP support for a particular aspect of the tax program (e.g., for a module 300, document 302, or field 304). In one embodiment, relevant automated support 356 may be made accessible to users when waiting for a support representative on a queue 352. In some cases, a user may find the information they need in the provided automated support 356. If the user does not receive the information they need from the automated support 356, the user may wait on queue to communicate directly with a support representative via VoIP. In one embodiment, support system 350 may provide user-selectable options to users on queues 352 to either access automated support 356 or to connect to and communicate with a support representative via VoIP. Note that all of the above is provided via computer systems over a network in accordance with one or more of various packetized network protocols and not via conventional telephone connections, although computer connections to sever(s) 360 may at least in part be accomplished via the conventional telephone network using modems.

Exemplary User Interface

FIG. 5A illustrates an exemplary, generic display and user interface that may be provided by a tax program 200 according to one embodiment. Display 250 may include one or more of, but is not limited to, a menu bar 252, a tool bar 254, and a tab bar 256. Menu bar 252 may provide one or more menus for accessing various functionalities of tax program 200 via user-selectable interface items (menu selections). Tool bar 254 may provide one or more tool icons for accessing various tools of tax program 200. Tab bar 256 may provide one or more tabs for switching between various views presented to the tax preparer. The currently selected tab displays forms for various modules. The user interface may provide one or more user interface items for selecting among modules and among electronic documents of selected modules. As an example, the Forms tab includes, on the left, a selection area to select a module from a list of modules. Module 1 is shown in bold text to indicate that it is currently selected. The Forms tab may also include a selection area to select a form (electronic document) of a selected module from a list of forms for the module. Form 1 is shown in bold text to indicate that it is currently selected. The Forms tab displays a current tax document 220A (Form 1). Note that these user interface items are exemplary, and that a person skilled in the art will recognize that other user interface mechanisms and items may be used to select among modules and forms. Further note that current tax document 220A is intended to be representative of both tax return documents (e.g., 1040, 1040A, 1040EZ, 1040NR, and 1040X forms of a Federal tax return) presented as templates for data entry by the user and data entry displays that include input fields for entering data and information to be transferred into tax return documents.

Current tax document 220A may include multiple fields 222. Values in these fields 222 may include values entered by the preparer via the user interface, values transferred from a previous tax return (previous tax return information 102 in FIG. 1) or from other documents 220 in the current tax return, and/or calculated values. Calculated values may be calculated from one or more other values, including values transferred from a previous tax return, values entered by the preparer via the user interface, and values from other fields 222. In some cases, calculated values displayed in one field 222 may be used in calculating a value for another field 222.

When preparing an electronic document such as document 220A, the preparer may have questions as to where a certain value displayed in one of the fields 222 came from, questions as to how the value was calculated, or other questions about various aspects of the tax program or tax preparation process. A value in a field 222, for example, may be a value transferred from a previous tax return or from another document 220 in the current tax return, or may be a value calculated using one or more input values from a previous tax return and/or from the current tax return. As an example, FIG. 4 illustrates field 222G of form 220A filled in with a value (12345.67 is used as an exemplary value). If the value in field 222G was calculated by the tax program 200 or transferred from some other electronic document, the preparer may be curious as to where the value came from or as to how it was calculated. As another example, the preparer may have questions as to how to complete a particular document 220A. A preparer may have a variety of other questions about a particular module, document 220, or one or more fields 222 of a document 220, or about other aspects of the tax program or tax preparation process. A description of the document 220 or field 222 may be included in the program, and may provide some information, but may not provide enough information or the correct information to satisfy the preparer's particular questions or concerns. It is probably not possible to anticipate all of the questions that preparers may have about the many different aspects of the tax preparation process.

Thus, embodiments may provide one or more user interface mechanisms and elements whereby a preparer or other user may locate and select a particular aspect of the tax program or tax preparation process (e.g., a module, document or field) and direct the tax program 200 to access VoIP support as described herein for the particular aspect (e.g., module, document, or field). FIGS. 5B through 5E illustrate exemplary user interface mechanisms and elements that may be provided for accessing VoIP support for field 222G of document 220A in FIG. 5A (or for other fields 222 in document 220A or on other electronic documents) as an example of accessing VoIP support for a particular aspect of the tax program, according to various embodiments. Note that similar user interface mechanisms and elements may be used to access VoIP support for modules, documents, or other aspects of tax program 200. Note that the user interface mechanisms and elements as illustrated and described herein are exemplary and are not intended to be limiting, and various modifications to or variations of the mechanisms and elements are possible, as are alternative user interface mechanisms and elements that are configured to perform similar functions.

In FIG. 5B, the user has selected field 222G of document 220A. The selection of field 222G is illustrated in FIG. 5B by a bold outline or border on the field. One of ordinary skill in the art will recognize that various user interface mechanisms for selecting a field may be used. For example, a preparer may select a field 222G by using a tab or enter key on a keyboard to go to the field 222G. As another example, a mouse or other cursor control device may be used to select a field 222G, for example by selecting the field with a mouse. One of ordinary skill in the art will also recognize that various other user interface methods for highlighting a selected field in a document than bolding an outline or border may be used.

Once selected, tax program 200 may provide one or more user interface mechanisms and elements for invoking functionality to access VoIP support for the selected field 222G. As an example, a mouse or other cursor control device may have two buttons. In this embodiment, the preparer may right-click the mouse when the cursor is on the field 222G (note that the right-clicking of the cursor control device may also serve to select the field 222G, as described above). In one embodiment, right-clicking on the field 222G may automatically cause VoIP support for the field 222G to be invoked. In one embodiment, right-clicking may cause a pop-up menu, or alternatively a dialog, to be displayed, from which the preparer may select from among one or more options for the selected field 222. At least one of the options may be to invoke VoIP support for the selected field 222. In another embodiment, once a field 222 is selected, a menu in menu bar 252 may be accessed by the preparer that includes a menu item to invoke VoIP support for the selected field. In one embodiment, selecting the menu item may automatically invoke VoIP support for the selected field 222. Alternatively, selecting the menu item may cause a pop-up menu, or alternatively a dialog, to be displayed, from which the preparer may select from among one or more options for the selected field 222. At least one of the options may be to invoke VoIP support for the selected field 222. Similarly, in another embodiment, one or more of the tool icons in tool bar 254 may be configured to invoke VoIP support for the selected field 222.

Figure 5C:
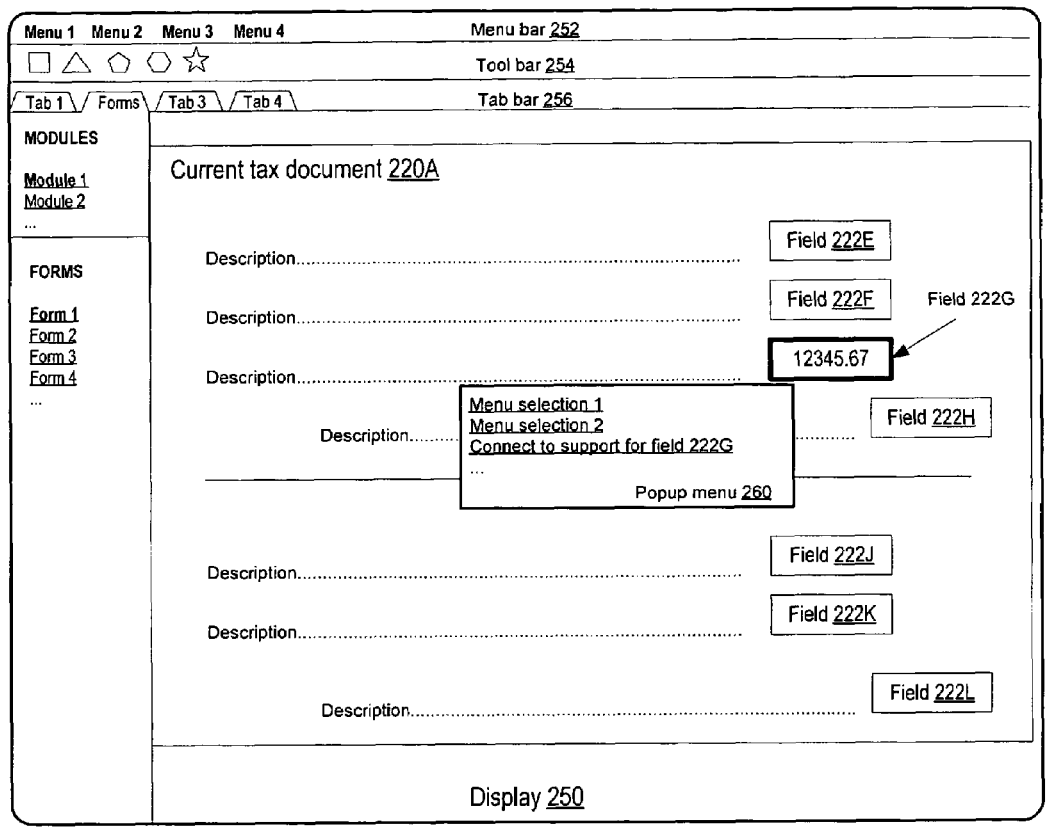

FIG. 5C illustrates an exemplary popup menu with a menu item to connect to VoIP support for a selected field according to one embodiment. A popup menu 260 may be displayed, for example, in response to a right-click on the field 222G. In one embodiment, user selection of the menu item Connect to support for field 222G in menu 260 may cause a VoIP request for the selected field 222 to be sent to the remote support system, where the VoIP request may be placed in an appropriate queue for the field 222G. Note that, in another embodiment, user selection of the menu item Connect to support for field 222G, instead of invoking VoIP support for the selected field 222, may instead cause a dialog box such as dialog box of FIG. 5D to be displayed.

Figure 5D:
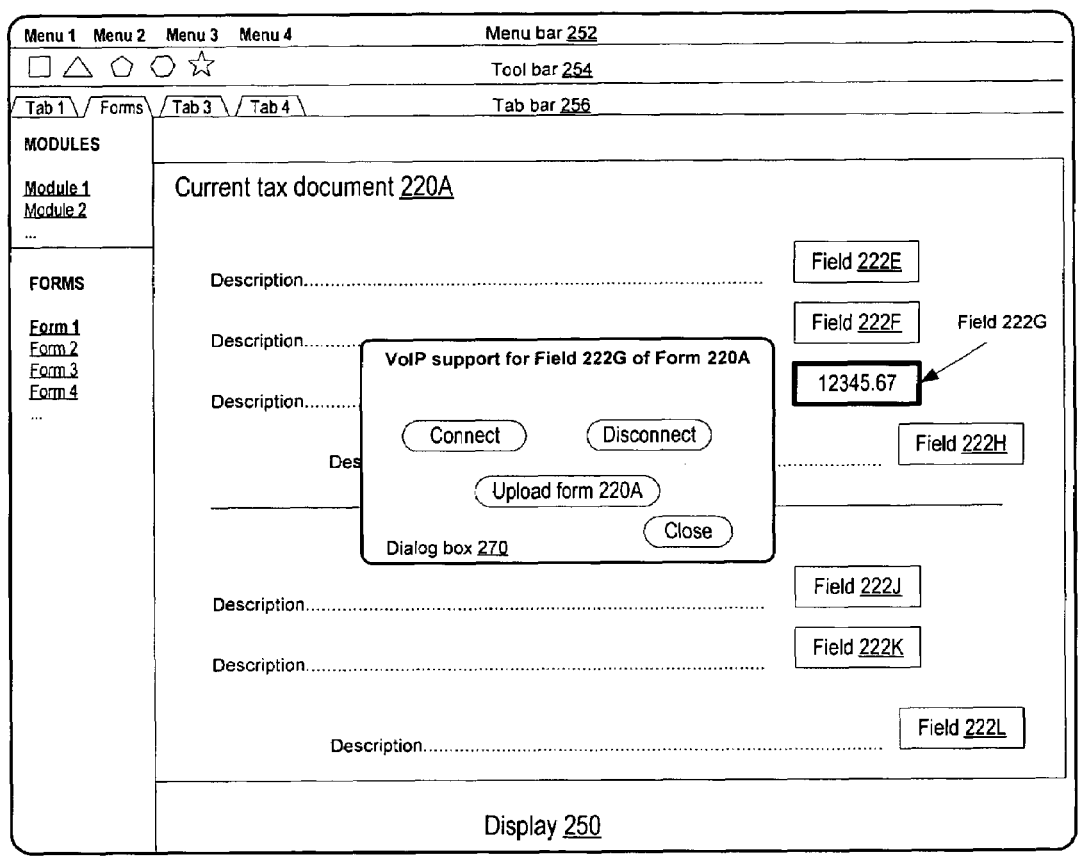

FIG. 5D illustrates an exemplary dialog box with user-selectable interface items to connect to VoIP support for a selected field according to one embodiment. The dialog box 270 may be displayed, for example, in response to a right-click on the field 222G. In one embodiment, user selection of an interface item (e.g., the "Connect" button) in the dialog box may cause a VoIP request for the selected field 222 to be sent to the remote support system, where the VoIP request may be placed in an appropriate queue for the field 222G. Dialog box 270 may include one or more other user interface items. In one embodiment, dialog box 270 may include a "Disconnect" button that, when enabled and selected by the user, terminates a VoIP connection. In one embodiment, dialog box 270 may include an "Upload" button that, when enabled and selected by the user, uploads the current document (e.g., document 220A) to the support system over the network for viewing by a support representative that is handling the user's VoIP request and thus communicating with the user via VoIP. Note that personal information on the form may be encrypted or otherwise hidden or removed from the uploaded document 220.

Figure 5E:
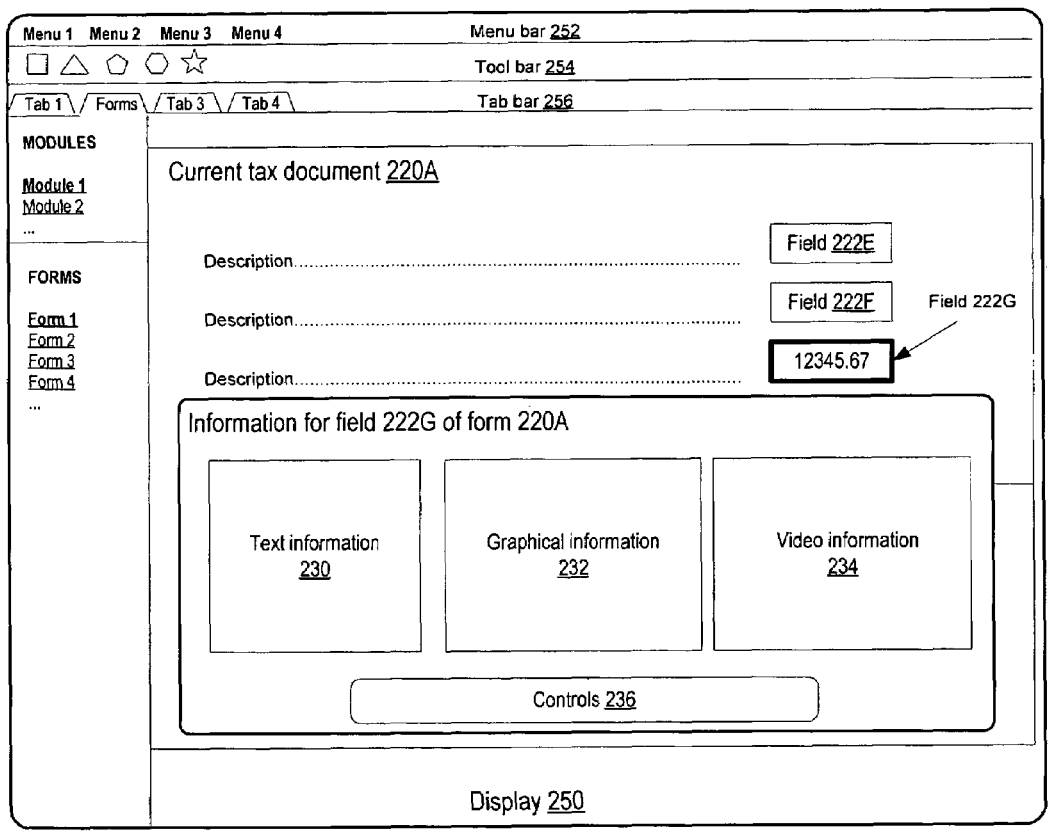

FIG. 5E illustrates an exemplary display that may be used to provide automated information for a particular aspect (e.g., a selected field, tax document or module) according to one embodiment. In one embodiment, the displayed information may be automatically downloaded by the support system to be displayed on the client system, for example if the preparer or other user has invoked VoIP support but is currently waiting in a queue for a support representative. In one embodiment, the displayed information may be downloaded from the support system to the client system upon request by the user via user interaction with the user interface of the tax program. For example, a menu or dialog box such as those illustrated in FIGS. 5C and 5D may include one or more user-selectable interface elements for downloading information related to a module, or tax document. Thus, if the user is on queue waiting to talk to a support representative via a VoIP connection, the user may select to view or listen to automated information related to the selected aspect of the tax program.

The provided information may include one or more items of text information 230 (e.g., a FAQ list), graphical information 232, video information 234, or other type of information or data related to specific aspects of the tax program or tax preparation process. Note that automated audio information may also be provided. The provided information may, for example, include tutorial information that describes how to prepare a tax document using the tax program, or even the general overall process of preparing a tax return in a particular module. As another example, the displayed information may include answers to frequently asked questions about a module, document or field. Note that other types of information may also be provided.

In one embodiment, provided information may be displayed in a pane that is an element of display 250. Alternatively, the provided information may be displayed in a separate window or display. While FIG. 5E shows the provided information displayed in a window or pane that overlays display 250, note that the provided information may be displayed in a separate window that may or may not overlay display 250 on the display screen, and that may be movable, resizable, etc. In one embodiment, the provided information may be downloaded and displayed via tax program 200. In another embodiment, the provided information may be downloaded and displayed via a separate program, for example a Web browser.

Note that the automated information may be provided via computer systems over a network in accordance with one or more of various packetized network protocols and not via conventional telephone connections, although computer connections to server(s) 360 may at least in part be accomplished via the conventional telephone network using modems. Further note that the automated information may be provided via one or more communications channels and in accordance with one or more of various packetized network protocols. As examples, which are not intended to be limiting: automated audio information may be provided to the user via VoIP or via a different protocol; video information may be provided over streaming video; some information or data may be provided over the network in accordance with HTTP or some other data transfer protocol. One of ordinary skill in the art will recognize that various other communications channels and protocols are suitable to provide automated information of various types to users on remote client systems from a server.

Figure 6:
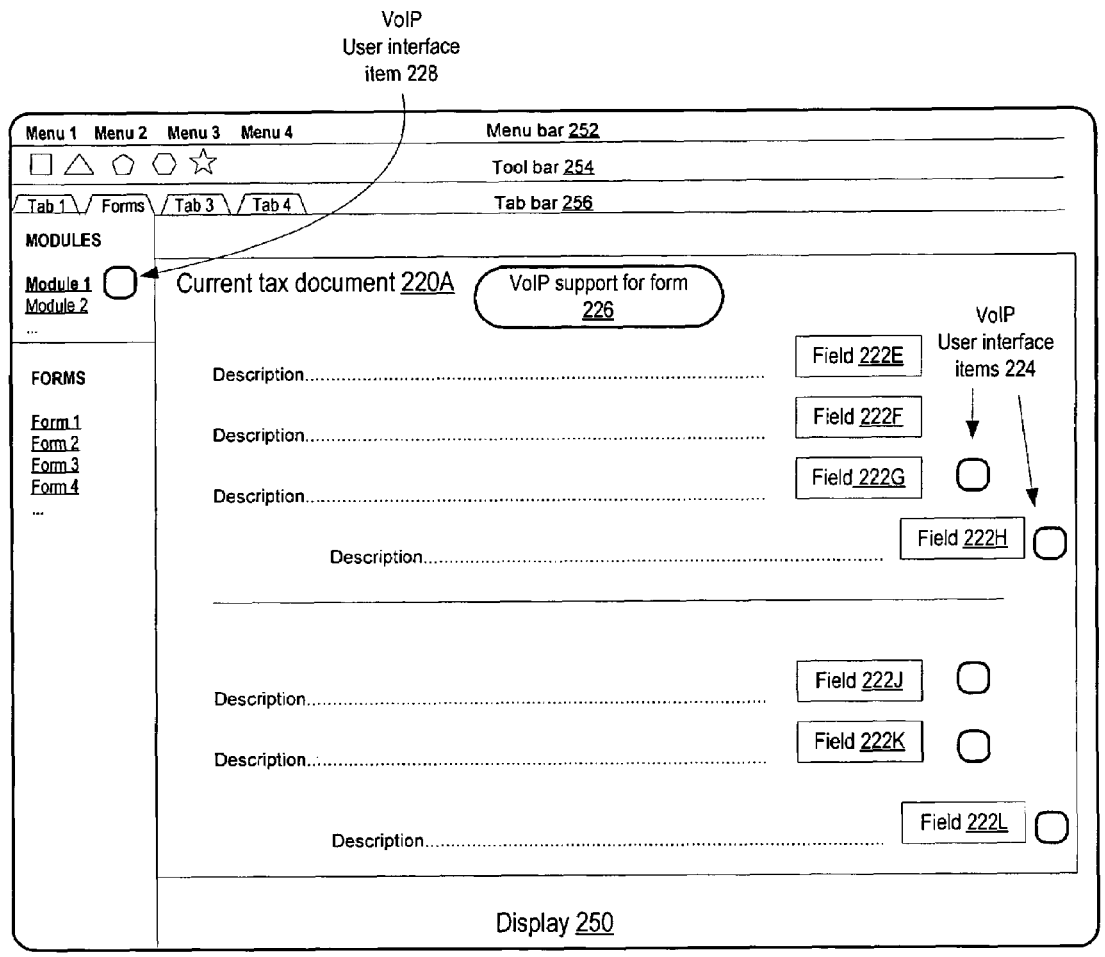
FIG. 6 illustrates an alternative and exemplary display and user interface that includes user-selectable interface items via which the preparer or other user may invoke VoIP support for particular modules, documents, or fields, according to one embodiment.

FIG. 6 illustrates an alternative and exemplary display and user interface that includes user-selectable interface items via which the preparer or other user may invoke VoIP support for particular aspects (e.g., modules, documents, or fields) according to one embodiment. In this example, one or more of the fields in an electronic document may have an associated user-selectable interface item 224 (e.g., an icon or button) that, when selected by the user, for example using a cursor control device such as a mouse, may cause the tax program to invoke VoIP support as described herein for the field. Alternatively, selecting a user-selectable interface item 224 may cause a popup menu or dialog, such as those described in FIGS. 5C and 5D, to be displayed, from which the user may select from among one or more options, including an option to invoke VoIP support for the field. Note that the use of the user-selectable interface item 224 is an alternative to other methods such as right-clicking on a selected field 222. Further note that some embodiments may use a combination of two or more different mechanisms for invoking VoIP support for a field.

In one embodiment, display 250 may include a user-selectable interface item 226 (e.g., an icon or button, a menu item, etc.) that, when selected by the user, for example using a cursor control device such as a mouse, may cause the tax program to invoke VoIP support as described herein for the current electronic document. In one embodiment, display 250 may include a user-selectable interface item 228 (e.g., an icon or button, a menu item, etc) that, when selected by the user, for example using a cursor control device such as a mouse, may cause the tax program to invoke VoIP support as described herein for the currently selected module. Other embodiments may include user-selectable interface items to invoke VoIP support for other aspects of the tax program or tax preparation process. Further, other displays, such as help pages or information pages presented by the tax program, may include user-selectable interface items or mechanisms to invoke VoIP support as described herein for various aspects of the tax program or tax preparation process.

Figure 7:
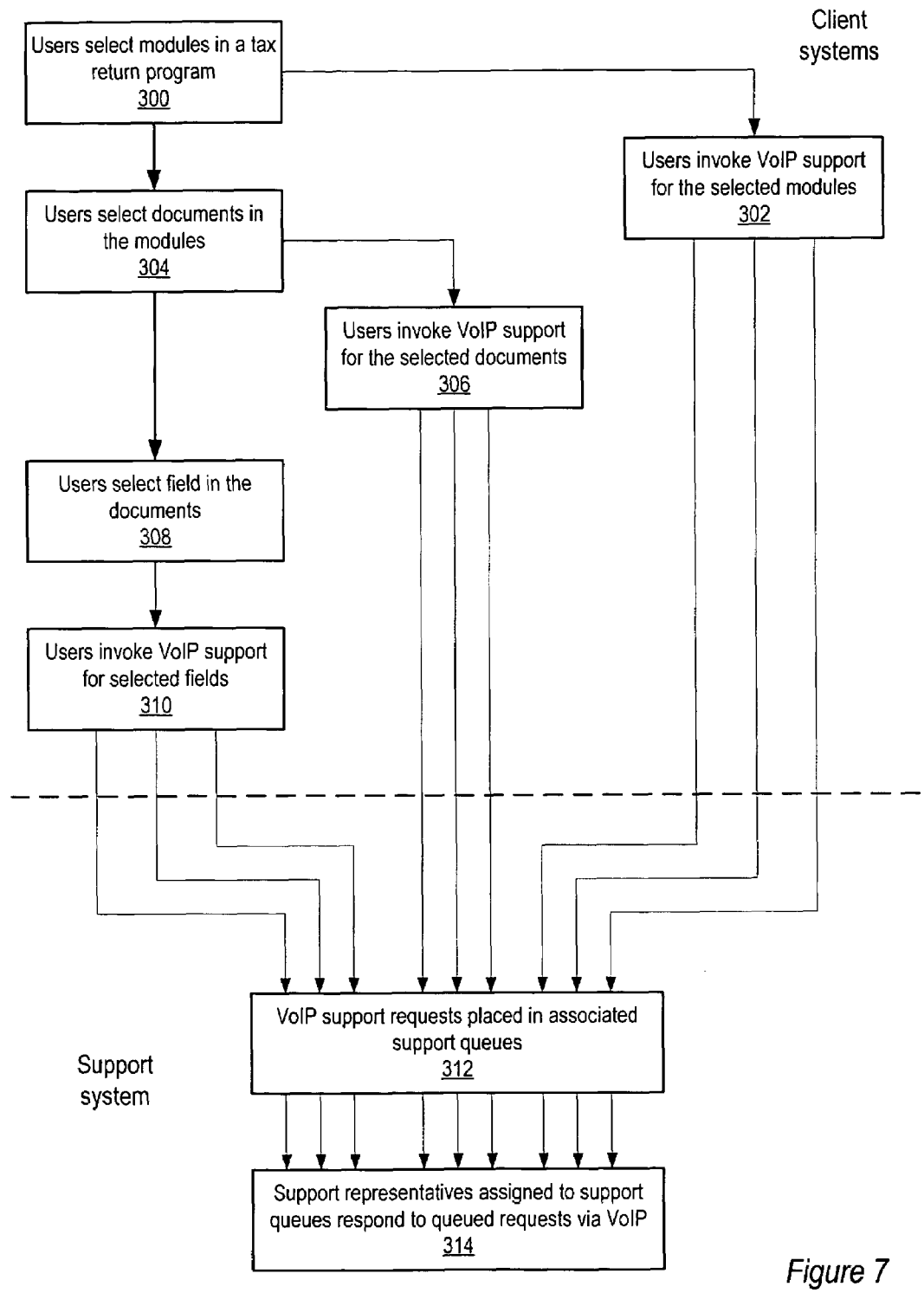
FIG. 7 is a flowchart of a method for providing customer support via Voice Over Internet Protocol (VoIP) in tax preparation software programs according to one embodiment.

FIG. 7 is a flowchart of a method for providing customer support via Voice Over Internet Protocol (VoIP) for particular aspects of tax preparation software programs according to one embodiment. Using this method, users of a tax program may be able to "drill down" to a desired aspect of the tax program and invoke VoIP support for that particular aspect. The users' VoIP support requests may thus be marked as specific to the particular aspects, and therefore may be automatically routed by the support system to aspect-specific support for the particular aspects of the tax program. Thus, the users may sort themselves into "support queues" that are specific to particular aspects of the program before contacting the support system.

As indicated at 300, users of a tax program (e.g., tax preparers) on client systems may select modules in the tax program. Modules may include one or more of, but are not limited to, 1040 federal returns, individual state returns, 1120 federal, corporate state returns, etc. In one embodiment, a user may be able to, via one or more user interface items, invoke VoIP support for a selected module, as indicated at 302. In one embodiment, a user may be able to, via one or more user interface items, select from among one or more documents within a selected module, as indicated at 304. In one embodiment, a user may be able to, via one or more user interface items, invoke VoIP support for a selected electronic document, as indicated at 306. In one embodiment, a user may be able to, via one or more user interface items, select from among one or more fields within a selected electronic document, as indicated at 308. In one embodiment, a user may be able to, via one or more user interface items, invoke VoIP support for a selected field of an electronic document, as indicated at 310.

At 302, 306 and 310, VoIP support requests may be generated and transmitted to a support system over a network. In one embodiment, each VoIP support request may include an indication of which specific aspect of the tax program the request was invoked for. Upon being received by the support system, the VoIP support requests may then be routed to the appropriate support representatives assigned to provide customer support for that particular aspect (note that a support representative may be assigned to provide customer support for more than one aspect of the tax program, and that one or more support representative may be assigned to provide customer support for one aspect in the tax program). In one embodiment, the incoming VoIP support requests may be placed into support queues associated with the specific aspects of the tax program indicated by the VoIP support requests, as indicated at 312. The support representatives assigned to particular support queues may then respond to the VoIP support requests in the queues, as indicated at 314, by communicating with the associated users via VoIP. In one embodiment, the support representatives may process queued support requests according to a first-in, first-out method.

In one embodiment, as previously described, users on queue waiting for a support representative may be provided with automated audio, video, textual, graphical or other type of information (via the client systems) corresponding to the aspect of the tax program for which the users invoked the VoIP support requests.

In one embodiment, as previously described, one or more user interface items may be provided whereby a user communicating via VoIP to a support representative may upload an electronic tax document or documents in question to the support system to be viewed by the support representative. In one embodiment, portions of the tax document (e.g., personal identification information) may be encrypted or otherwise removed from the document(s) before uploading the documents to the support system.

In one embodiment, as previously described, activity on the support queues may be monitored by the support system, which may use the information collected via said monitoring to automatically detect problem areas (e.g., very active or backlogged queues). Resources may then be dynamically allocated to address the problem areas. For example, an additional support representative may be added to process VoIP support requests on a busy support queue. As another example, automated information may be generated and provided to users on a support queue that may address at least some problems of some users on a particular support queue so that at least some users may obtain the information they need related to a particular aspect of the tax program corresponding to the support queue without having to talk to a support representative.

Figure 8:
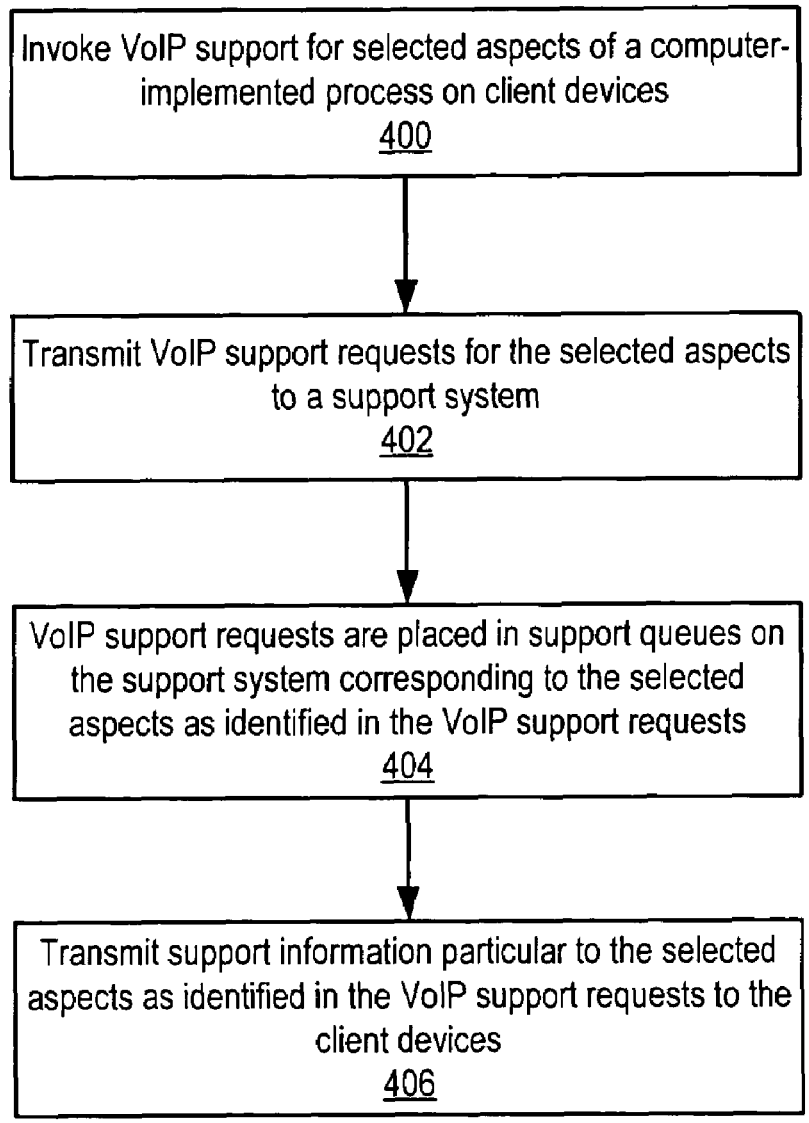
FIG. 8 is a flowchart of a method for providing customer support via Voice Over Internet Protocol (VoIP) for computer-implemented processes according to one embodiment.

FIG. 8 is a flowchart of a method for providing customer support via Voice Over Internet Protocol (VoIP) for computer-implemented processes according to one embodiment. As indicated at 400, VoIP support for selected aspects of a computer-implemented process may be invoked on one or more client devices via user interaction with a user interface for the computer-implemented process. An exemplary user interface for a computer-implemented process (specifically, for a computer-implemented tax preparation process) is described above in reference to FIGS. 5A through 5E and FIG. 6. As indicated at 402, VoIP support requests for the selected aspects may be transmitted to a support system in response to the invocation of VoIP support for the selected aspects. Each VoIP support request may include information identifying the selected aspect of the computer-implemented process for which the VoIP support request was invoked on the client device. As indicated at 404, on the support system, the received VoIP support requests may be placed in support queues corresponding to the selected aspects as identified in the VoIP support requests. As indicated at 406, for each received VoIP support request, support information particular to the selected aspect as identified in the VoIP support request may be transmitted to the client device from which the VoIP support request was received. This transmitted support information may include automated information transmitted over a network in accordance with one or more of various communications channels and in accordance with one or more of various packetized network protocols and/or voice communications, transmitted over a network in accordance with VoIP, with a support representative skilled in at least the selected aspect and assigned to the support queue in which the VoIP support request was placed, as previously described.

VoIP Support in Other Locations within a Tax Program

In some embodiments, VoIP support may be invoked from other places in or components of a tax program than from the exemplary user interface of display 250 as described in FIGS. 5A through 5E and FIG. 6. As an example, in one embodiment, VoIP support for particular aspects of a tax program may be integrated into a help component of the tax program. Note that the help component may be part of the tax program, or alternatively may be a standalone program. A tax program's help component may, for example, be invoked by selecting a menu item from a menu in menu bar 252 of the exemplary display 250 in FIG. 5A, or alternatively by selecting a tool item in tool bar 254. Other methods of invoking a help component may be used. Once invoked, the help component may provide topical help information related to aspects of the tax preparation process or of the tax program (e.g., help related to using the user interface of the tax program to prepare tax returns in general or specific tax returns or tax return documents). Note that topical health information may be hierarchically organized according to topics, subtopics, etc. to allow the user to more readily locate a particular help topic of interest by "drilling down" from a broad topic heading to a more specific topic. Alternatively, a list of topics may be shown in alphanumeric order. As an example, the help component may provide help information organized according to the structure of tax modules as described herein (see, for example, FIG. 4) to allow the user to more readily locate help information for particular modules, tax documents of the modules, and fields of the tax documents. A help component may provide alternative views of the help information to allow the user to search for help information using different models.

However the help information is organized and presented to the user, the tax program may provide a user interface that allows the user to browse the help information, to search the help information for topics of interest, etc. The user may use this user interface to search for and locate available help information pertaining to a particular topic (e.g., a particular module, document, or field). Once at a display of help information for a particular topic, the user interface may provide one or more mechanisms that allow the user to invoke VoIP support as described herein for the topic. Note that "topic" in this case is thus analogous to "aspect" as used previously herein. In other words, selecting a topic to invoke VoIP support for that topic is analogous to selecting an aspect to invoke VoIP support for that aspect. Therefore, VoIP support invoked for each topic may be assigned to a particular support queue in the support system corresponding to that topic (aspect).

As another example, in one embodiment, VoIP support may be integrated into a tutorial component of a tax program. Note that the tutorial component may be part of the tax program, or alternatively may be a standalone program. A tax program may provide one or more training tutorials through which tax preparers may train in the processes of tax preparation using the tax program before actually preparing tax returns. As one example of integrating VoIP support into a tutorial component of a tax program, user interface items to invoke VoIP support for particular modules, documents, fields, topics, etc., may be included at appropriate locations in the user interface of the tutorial component that allow the trainee to invoke VoIP support if they have questions related to a particular location or topic of the tutorial. As another example of integrating VoIP support into a tutorial component, user interface items to invoke VoIP support may be included in the user interface of the tutorial component that allow trainees to access live, or alternatively recorded, instructions or lessons related to particular topics presented by human instructors. Through VoIP, the trainees may be able to ask questions of the live instructors. Further, graphical and/or textual training materials may be downloaded to and displayed on the trainees' computer systems.

Providing VoIP Support External to a Tax Program

While embodiments of VoIP support are generally described herein as being integrated in a tax program, note that in some embodiments, VoIP support for a tax program may be provided via a separate mechanism (e.g., an application) that enables tax preparers or other users to locate and invoke VoIP support for particular topics (aspects) related to tax preparation, and that thus allow the users to sort themselves into the correct support queues and/or to the correct support representatives. As an example, the tax program vendor may provide a Web site with one or more Web pages through which the user may, via a Web browser, locate and invoke VoIP support for various topics (aspects) related to the tax program.

Exemplary System

Figure 9:
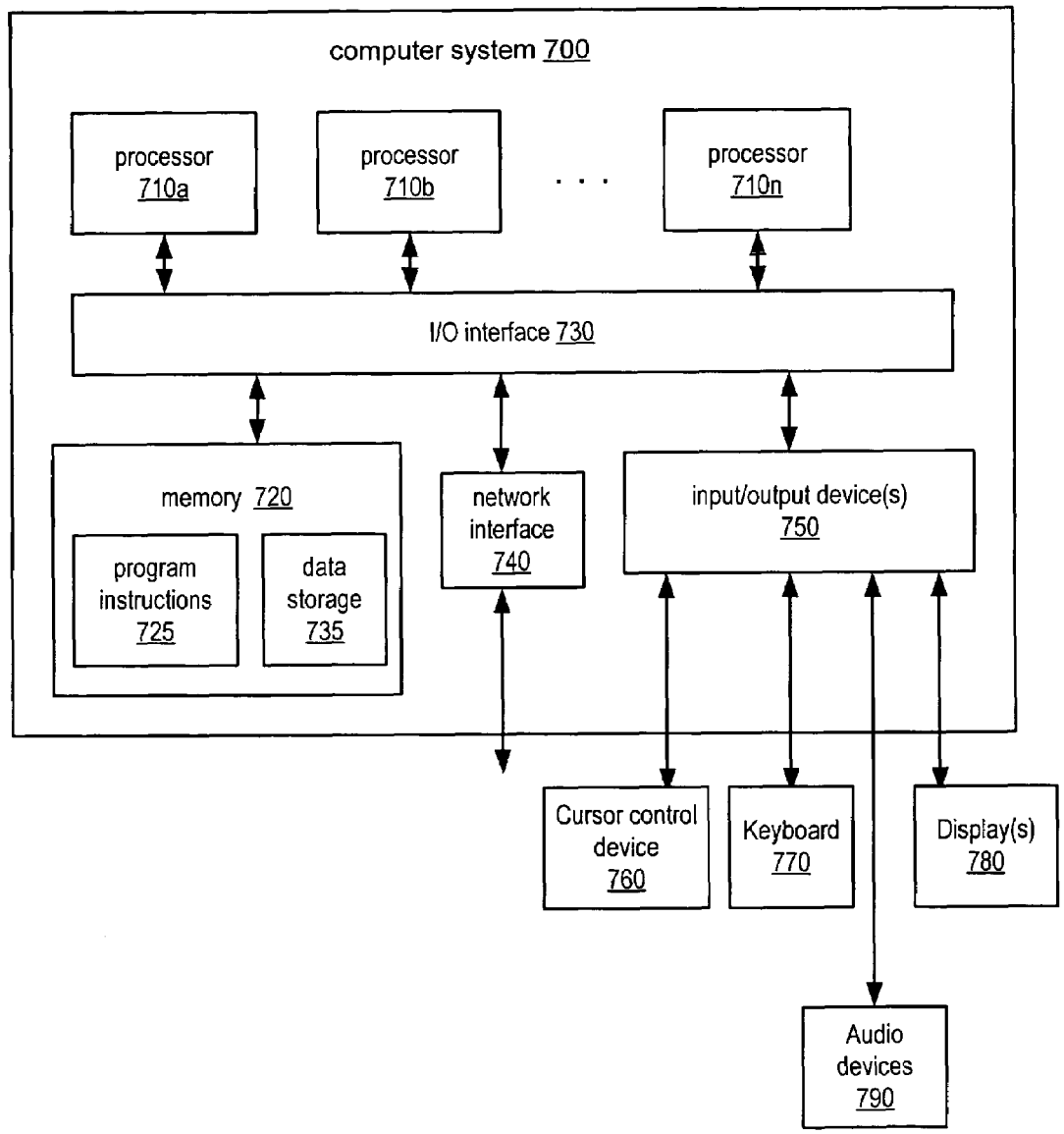
FIG. 9 illustrates an exemplary computer system on which embodiments may be implemented.

Various components or elements of embodiments of a system and method for providing customer support via Voice Over Internet Protocol (VoIP) in tax preparation software programs, as described herein, may be executed on one or more computer systems, which may interact with various other devices. One such computer system is illustrated by FIG. 9. Note that computer system 700 may be representative of a client system 362 or a server 360 as illustrated in FIG. 3.

In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, and display(s) 780. To support VoIP, computer system 700 may include one or more audio devices 790 coupled to I/O interface, such as a speaker and microphone, a headset, etc. In some embodiments, it is contemplated that embodiments may be implemented using a single instance of computer system 700, while in other embodiments multiple such systems, or multiple nodes making up computer system 700, may be configured to host different portions or instances of embodiments. For example, in one embodiment some elements (e.g., a tax program 200, or elements of a support system 350) may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

System memory 720 may be configured to store program instructions and/or data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above, are shown stored within system memory 720 as program instructions 725 and data storage 735, respectively. In other embodiments, program instructions and/or data may be received, sent or stored upon different types of computer-accessible media or on similar media separate from system memory 720 or computer system 700. Generally speaking, a computer-accessible medium may include storage media or memory media such as magnetic or optical media, e.g., disk or CD/DVD-ROM coupled to computer system 700 via I/O interface 730. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 740.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices attached to a network, such as other computer systems, or between nodes of computer system 700. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or retrieving data by one or more computer system 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

As shown in FIG. 9, memory 720 may include program instructions 725, configured to implement embodiments of a system and method for providing customer support via Voice Over Internet Protocol (VoIP) in tax preparation software programs as described herein, and data storage 735, comprising various documents, tables, databases, etc. accessible by program instructions 725. In one embodiment, program instructions 725 may include one or more of the software elements illustrated in FIGS. 1, through 4 (e.g., tax program 200 or support system 350) and data storage 736 may include various data used by either tax program 200 or support system 350. In other embodiments, different software elements and data may be included.

Those skilled in the art will appreciate that computer system 700 is merely illustrative and is not intended to limit the scope of the present invention. In particular, the computer system and devices may include any combination of hardware or software that can perform the indicated functions, including computers, network devices, internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer-implemented method, comprising:
providing a first section of an electronic document, the first section including a first user interface element configured to invoke a first Voice over Internet Protocol (VoIP) connection to a first support queue of a support system, wherein the first support queue is targeted toward providing first topical help information specifically related to the first section of the electronic document, and wherein the first user interface element is related to the preparation of financial returns, including tax returns, prepared for one or more governmental entities for specified reporting periods;
invoking the first VoIP connection to the first support queue of the support system in response to first user input to the first user interface element in the first section of the electronic document, wherein the support system assigns the first VoIP connection to the first support queue based on the first user input to the first user interface element, and wherein the first topical help information from the first support queue is used to complete the first section of the electronic document;
providing a second section of the electronic document, the second section including a second user interface element configured to invoke a second Voice over Internet Protocol (VoIP) connection to a second support queue of the support system, wherein the second support queue is targeted toward providing second topical help information specifically related to the second section of the electronic document; and invoking the second VoIP connection to the second support queue of the support system in response to second user input to the second user interface element in the second section of the electronic document, wherein the support system assigns the second VoIP connection to the second support queue based on the second user input to the second user interface element, and wherein the second topical help information from the second support queue is used to complete the second section of the electronic document.

2. The computer-implemented method as recited in claim 1, wherein said invoking the first VoIP connection to the support system comprises transmitting a VoIP support request to the support system, wherein the VoIP support request includes information identifying the first section of the electronic document.

3. The computer-implemented method as recited in claim 1, wherein the electronic document is a tax document.

4. The computer-implemented method as recited in claim 1, wherein the first section of the electronic document associated with the first user interface element is one of a particular module of a plurality of modules of the electronic document.

5. The computer-implemented method as recited in claim 1, further comprising receiving voice communications from a support representative associated with the first support queue via the first VoIP connection to the first support queue.

6. The computer-implemented method as recited in claim 1, further comprising receiving automated information related to the first section of the electronic document associated with the first user interface element in response to said invoking a VoIP connection to the support system.

7. The computer-implemented method as recited in claim 6, wherein the automated information includes one or more of textual information, graphical information, audio information, and video information.

8. The computer-implemented method as recited in claim 6, wherein the automated information is received over a network in accordance with one or more of a plurality of packetized network protocols.

9. The computer-implemented method as recited in claim 1, further comprising transmitting to the first support queue at least a portion of the electronic document.

10. A system, comprising:
one or more processors;
a display device; and
a memory coupled to the one or more processors and the display device, wherein the memory comprises program instructions executable by the one or more processors to:
display on the display device a first section of an electronic document, the first section including a first user interface element configured to invoke a first Voice over Internet Protocol (VoIP) connection to a first support queue of a support system, wherein the first support queue is targeted toward providing first topical help information specifically related to the first section of the electronic document, and wherein the first user interface element is related to the preparation of financial returns, including tax returns, prepared for one or more governmental entities for specified reporting periods;

invoke the first VoIP connection to the first support queue of the support system in response to first user input to the first user interface element in the first section of the electronic document, wherein the support system assigns the first VoIP connection to the first support queue based on the first user input to the first user interface element, and wherein the first topical help information from the first support queue is used to complete the first section of the electronic document;

display on the display device a second section of the electronic document, the second section including a second user interface element configured to invoke a second Voice over Internet Protocol (VoIP) connection to a second support queue of the support system, wherein the second support queue is targeted toward providing second topical help information specifically related to the second section of the electronic document; and invoke the second VoIP connection to the second support queue of the support system in response to second user input to the second user interface element in the second section of the electronic document, wherein the support system assigns the second VoIP connection to the second support queue based on the second user input to the second user interface element, and wherein the second topical help information from the second support queue is used to complete the second section of the electronic document.

11. The system as recited in claim 10, wherein, to invoke the first VoIP connection to the support system, the program instructions are further executable by the one or more processors to transmit a VoIP support request to the support system, wherein the VoIP support request includes information identifying first section of the electronic document.

12. The system as recited in claim 10, wherein the electronic document is a tax document.

13. The system as recited in claim 10, wherein the first section of the electronic document associated with the first user interface element is one of a particular module of a plurality of modules of the electronic document.

14. The system as recited in claim 10, wherein the program instructions are further executable by the one or more processors to receive voice communications from a support representative associated with the first support queue via the first VoIP connection to the first support queue.

15. The system as recited in claim 10, wherein the program instructions are further executable by the one or more processors to receive automated information related to the first section of the electronic document associated with the first user interface element in response to said invoking a VoIP connection to the support system.

16. The system as recited in claim 15, wherein the automated information includes one or more of textual information, graphical information; audio information, and video information.

17. The system as recited in claim 15, wherein the program instructions are further executable by the one or more processors to receive the automated information over a network in accordance with one or more of a plurality of packetized network protocols.

18. The system as recited in claim 10, wherein the program instructions are further executable by the one or more processors to transmit to the first support queue at least a portion of the electronic document.

19. A computer readable storage medium comprising program instructions, wherein the program instructions are computer-executable to implement:

providing a first section of an electronic document, the first section including a first user interface element configured to invoke a first Voice over Internet Protocol (VoIP) connection to a first support queue of a support system, wherein the first support queue is targeted toward providing first topical help information specifically related to the first section of the electronic document, and wherein the first user interface element is related to the preparation of financial returns, including tax returns, prepared for one or more governmental entities for specified reporting periods;

invoking the first VoIP connection to the first support queue of the support system in response to first user input to the first user interface element in the first section of the electronic document, wherein the support system assigns the first VoIP connection to the first support queue based on the first user input to the first user interface element, and wherein the first topical help information from the first support queue is used to complete the first section of the electronic document;

providing a second section of the electronic document, the second section including a second user interface element configured to invoke a second Voice over Internet Protocol (VoIP) connection to a second support queue of the support system, wherein the second support queue is targeted toward providing second topical help information specifically related to the second section of the electronic document; and invoking the second VoIP connection to the second support queue of the support system in response to second user input to the second user interface element in the second section of the electronic document, wherein the support system assigns the second VoIP connection to the second support queue based on the second user input to the second user interface element, and wherein the second topical help information from the second support queue is used to complete the second section of the electronic document.

20. The computer readable storage medium as recited in claim 19, wherein said invoking the first VoIP connection to the support system comprises transmitting a VoIP support request to the support system, wherein the VoIP support request includes information identifying the first section of the electronic document.

21. The computer readable storage medium as recited in claim 19, wherein the electronic document is a tax document.

22. The computer readable storage medium as recited in claim 19, wherein the first section of the electronic document associated with the first user interface element is one of a particular module of a plurality of modules of the electronic document.

23. The computer readable storage medium as recited in claim 19, wherein the program instructions are further computer-executable to implement receiving voice communications from a support representative associated with the first support queue via the first VoIP connection to the first support queue.

24. The computer readable storage medium as recited in claim 19, wherein the program instructions are further computer-executable to implement receiving automated information related to the first section of the electronic document associated with the first user interface element in response to said invoking a VoIP connection to the support system.

25. The computer readable storage medium as recited in claim 24, wherein the automated information includes one or more of textual information, graphical information, audio information, and video information.

26. The computer readable storage medium as recited in claim 24, wherein the automated information is received over a network in accordance with one or more of a plurality of packetized network protocols.

27. The computer readable storage medium as recited in claim 19, wherein the program instructions are further computer-executable to implement transmitting to the first support queue at least a portion of the electronic document.

* * * * *

UNITED STATES PATENT AND TRADEMARK OFFICE
CERTIFICATE OF CORRECTION

PATENT NO. : 7,716,099 B1 Page 1 of 1
APPLICATION NO. : 11/481491
DATED : May 11, 2010
INVENTOR(S) : Pamela R. Welch et al.

It is certified that error appears in the above-identified patent and that said Letters Patent is hereby corrected as shown below:

On the Title Page Item (56), References Cited, U.S. Patent Documents, please add --2007/0033117 Murray--;

--2006/0178961 Stanley et al.--;

--2006/0155632 Cherkas et al.--;

--2003/0036912 Sobotta et al.--.

Signed and Sealed this

Third Day of August, 2010

David J. Kappos
*Director of the United States Patent and Trademark Office*